No. 829,705. PATENTED AUG. 28, 1906.
M. V. FERN.
COMB CLEANER.
APPLICATION FILED NOV. 17, 1905.
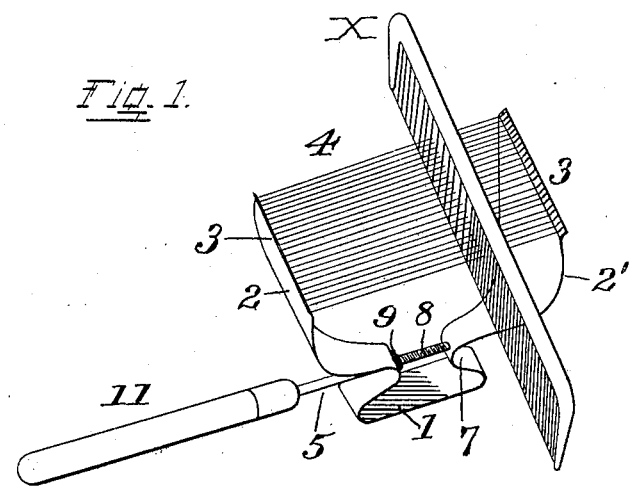
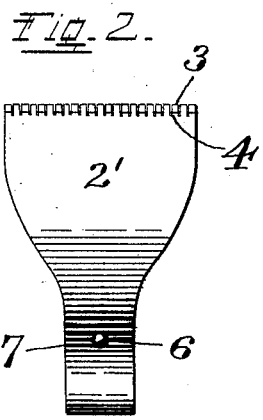
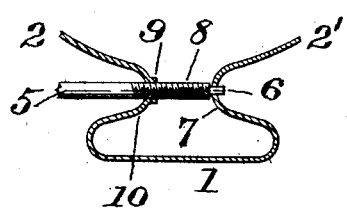
Witnesses.
Homer Bradford.
George E. Fern.
Inventor.
Mary Virginia Fern,
by John Elias Jones,
her attorney.

UNITED STATES PATENT OFFICE.

MARY V. FERN, OF MILFORD, OHIO.

COMB-CLEANER.

No. 829,705.  Specification of Letters Patent.  Patented Aug. 28, 1906.

Application filed November 17, 1905. Serial No. 287,856.

*To all whom it may concern:*

Be it known that I, MARY VIRGINIA FERN, a citizen of the United States of America, and a resident of Milford, in the county of Clermont and State of Ohio, have invented certain new and useful Improvements in Comb-Cleaners, of which the following is a specification.

This invention relates to devices or implements for conveniently cleaning combs of the deposits accumulating between the teeth thereof when in use on the hair; and it consists in the provision of a concave or U-shape frame or holder having a series of teeth or projections constructed along its opposite outermost edges, a row or series of parallel strings or threads strung or engaged in succession over said teeth, so as to span the space between the outer ends of said frame, and means for spreading the said U-shape frame at its outer ends and placing said strings under tension to make them taut for the reciprocal movements of the comb-teeth in passing the comb to and fro through the strings with its teeth engaging the latter, which remove and gather the accumulations therefrom as desired.

In the accompanying drawings, which serve to illustrate my invention, Figure 1 is a perspective view of the device containing my improvement, showing it in position for operation with a comb engaging the cleaning-strings; Fig. 2, a rear end elevation of the device, and Fig. 3 a fragmentary axial section of the lower portion or base of the device to show the means for placing the string-supporting arms or members under tension and straining or tightening said strings for use in connection with the comb-teeth.

In the views, 1 indicates a flat bar having its opposite ends inwardly and upwardly bent into a reverse S shape and extended into broadening tapered arms or members 2 2′, the extreme outer edges of which members 2 2′ are flared outwardly (see Fig. 1) and slitted so as to form a series of teeth 3. 4 indicates a series of parallel strings or threads caught at their respective ends on the teeth 3 and spanning the space between the opposite outer ends of the members 2 2′. I prefer to use a single length of string or thread and catch it in the teeth by passing it back and forth along the series of teeth at the outer ends of the two members 2 2′, suitably knotting the string at its opposite ends or winding it over the end teeth, as desired. The ends of the string should, however, be well secured so that the series of parallel strands may be drawn taut for use. The string too should be of a somewhat unfinished rough or fluffy texture on its surface, preferably undressed thread or twine of cotton having a nap to secure the best results; but the ordinary thread or string in general use and at hand will be of good avail in the operation of the device for the purpose intended.

It will be seen in Fig. 1 that the members 2 2′ extend outward in concave form to provide a U-shape supporting-frame for the said cleaning-strings, which is the form that I prefer, as it provides a suitable space beneath the said strings for the full depth of the teeth of the comb in passing the latter in engagement along the strings, as shown at X in Fig. 1.

5 represents a stem or rod having a shouldered and reduced inner end 6 freely engaging or bearing in an opening made in the upwardly-turned end 7 of the base-plate 1, in which it turns. Back of said shouldered end 6 the stem 5 is partially screw-threaded, as shown at 8, for engagement with a threaded opening in the struck-up or bossed portion 9 of the upturned end 10 of the base-plate 1, (see Fig. 3,) and the outer plain end of the stem is suitably extended beyond the part 10 to receive a handle 11, securely fastened in place and adapted for use in holding the implement and for turning the stem in either direction for the purpose of exerting more or less tension on the series of strings 4.

The inner shouldered end of the stem bearing in the end 7 of the base-plate 1 causes the member 2′ to spread outwardly away from the other member 2 when the screw is turned forward (it being a right-hand one) and the strings to become under the desired tension for use. The frame is preferably made of resilient sheet-steel with a tendency to bring the arms or members 2 2′ normally toward each other for the purpose of stringing the device when required. After the comb has been passed over the strings a number of times to and fro the accumulations adhere to the said strings and the latter may then be removed by cutting, burning, or otherwise and about as readily replaced for use and at trifling expense.

I claim—

A comb-cleaner comprising a pair of resilient arms or members spaced apart into U shape and each member having a series of outwardly-flaring teeth along its outer edge, a yoke or base-plate having upwardly and inwardly turned ends the latter being spaced apart and made integral with the inwardly-turned inner ends of the said arms or members, a series of parallel strings or threads spanning the space between the outer ends of said arms or members and engaging the teeth along said outer edges of the arms or members, and a stem or rod having a handle at its outer end and screw-threaded along its inner end with a reduced extremity freely engaging or bearing in an opening in the point of union between the yoke and one of the string-supporting arms and said screw-thread engaging a struck-up or bossed female-threaded portion in the other point of union between the said yoke and the other of said arms, whereby the tension of the strings may be adjusted and regulated.

Signed at Cincinnati, Ohio, this 6th day of November, 1905.

MARY V. FERN.

Witnesses:
JOHN ELIAS JONES,
HOMER BRADFORD.